US012695091B2

(12) United States Patent
Lee et al.

(10) Patent No.: US 12,695,091 B2
(45) Date of Patent: Jul. 28, 2026

(54) NEGATIVE ELECTRODE ACTIVE MATERIAL FOR RECHARGEABLE LITHIUM BATTERY, METHOD FOR MANUFACTURING SAME, AND RECHARGEABLE LITHIUM BATTERY INCLUDING SAME

(71) Applicants:POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Gang Ho Lee, Pohang-si (KR); Jung-Chul An, Pohang-si (KR); Sei Min Park, Pohang-si (KR); Jong Hoon Yoon, Pohang-si (KR); Hyun-Chul Jo, Pohang-si (KR)

(73) Assignees: POSCO Holdings Inc., Seoul (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 542 days.

(21) Appl. No.: 18/268,709

(22) PCT Filed: Dec. 20, 2021

(86) PCT No.: PCT/KR2021/019434
§ 371 (c)(1),
(2) Date: Jun. 21, 2023

(87) PCT Pub. No.: WO2022/139382
PCT Pub. Date: Jun. 30, 2022

(65) Prior Publication Data
US 2024/0413331 A1      Dec. 12, 2024

(30) Foreign Application Priority Data
Dec. 21, 2020    (KR) ........................ 10-2020-0179597

(51) Int. Cl.
| | |
|---|---|
| *H01M 4/587* | (2010.01) |
| *C01B 32/205* | (2017.01) |
| *C01B 32/21* | (2017.01) |
| *H01M 4/02* | (2006.01) |
| *H01M 4/36* | (2006.01) |

(52) U.S. Cl.
CPC .......... *H01M 4/587* (2013.01); *C01B 32/205* (2017.08); *C01B 32/21* (2017.08); *H01M 4/366* (2013.01); *C01P 2004/51* (2013.01); *C01P 2004/80* (2013.01); *C01P 2006/40* (2013.01); *H01M 2004/027* (2013.01)

(58) Field of Classification Search
CPC ................ H01M 4/587; H01M 4/366; H01M 2004/027; C01B 32/205; C01B 32/21; C01P 2004/51; C01P 2004/80; C01P 2006/40
USPC ........... 429/231.8; 423/445 R, 460; 428/403; 252/502
See application file for complete search history.

(56) References Cited

U.S. PATENT DOCUMENTS

| | | | | |
|---|---|---|---|---|
| 5,908,715 A | * | 6/1999 | Liu ....................... | H01M 4/587 429/217 |
| 2004/0151837 A1 | | 8/2004 | Morita et al. | |
| 2014/0065479 A1 | * | 3/2014 | Yamada .................. | C01B 32/05 429/211 |
| 2023/0420675 A1 | * | 12/2023 | Cho ....................... | H01M 4/587 |

FOREIGN PATENT DOCUMENTS

| | | | | |
|---|---|---|---|---|
| EP | 2709195 A1 | | 3/2014 | |
| JP | 2000-90925 A | | 3/2000 | |
| JP | 2000090925 A | * | 3/2000 | ............. Y02E 60/10 |
| JP | 2016-131159 A | | 7/2016 | |
| JP | 2017-525083 A | | 8/2017 | |
| KR | 101419792 B1 | | 7/2014 | |
| KR | 10-2015-0138265 A | | 12/2015 | |
| KR | 10-2016-0066632 A | | 6/2016 | |
| KR | 20160066632 A | * | 6/2016 | ............. B01D 3/009 |
| KR | 10-2018-0015251 A | | 2/2018 | |
| KR | 10-2019-0108883 A | | 9/2019 | |
| KR | 10-2019-0143620 A | | 12/2019 | |
| KR | 10-2019-0143621 A | | 12/2019 | |
| KR | 10-2020-0036429 A | | 4/2020 | |

(Continued)

OTHER PUBLICATIONS

International Search Report of PCT/KR2021/019434 dated Mar. 23, 2022 [PCT/ISA/210].
Extended European Search Report issued Dec. 2, 2024 in Application No. 21911449.3.
Communication dated Jul. 16, 2024, issued in Japanese Application No. 2023-538077.

*Primary Examiner* — Patricia L. Hailey
(74) *Attorney, Agent, or Firm* — Sughrue Mion, PLLC

(57) ABSTRACT

It is related to a manufacturing method of a negative electrode active material 의 for lithium secondary battery, comprising: preparing an artificial graphite; mixing the artificial graphite and a coal tar to form a coating layer on the artificial graphite; and carbonizing the artificial graphite on which the coating layer is formed, wherein, the artificial graphite has a degree of sphericity of 0.6 to 1; and in the step of preparing an artificial graphite, the artificial graphite contains 20 wt % or more of artificial graphite derived from coal-based coke.

20 Claims, No Drawings

(56)         References Cited

FOREIGN PATENT DOCUMENTS

| KR | 10-2020-0042015 A | 4/2020 |
| KR | 10-2020-0065562 A | 6/2020 |
| KR | 10-2020-0076498 A | 6/2020 |
| KR | 10-2020-0076504 A | 6/2020 |
| KR | 20200076504 A * | 6/2020 ........... C01B 32/205 |
| KR | 10-2020-0136335 A | 12/2020 |

* cited by examiner

NEGATIVE ELECTRODE ACTIVE MATERIAL FOR RECHARGEABLE LITHIUM BATTERY, METHOD FOR MANUFACTURING SAME, AND RECHARGEABLE LITHIUM BATTERY INCLUDING SAME

CROSS REFERENCE TO RELATED APPLICATIONS

This application is a National Stage of International Application No. PCT/KR2021/019434 filed Dec. 20, 2021, claiming priority based on Korean Patent Application No. 10-2020-0179597 filed Dec. 21, 2020, the entire disclosures of which are incorporated herein by reference.

BACKGROUND OF THE INVENTION

Field of the Invention

The present disclosure is related to a negative electrode material, method of preparing the same and lithium secondary battery. Specifically, the present invention relates to a negative electrode active material for a lithium secondary battery having excellent electrode adhesion and excellent battery performance, a manufacturing method thereof, and a lithium secondary battery including the same.

Description of the Related Art

Since the graphite/carbon-based negative electrode active material used as the negative electrode of the lithium secondary battery has a potential close to the electrode potential of lithium metal, the change in crystal structure during the intercalation and deintercalation of ionic lithium is small, enabling a continuous and repeated oxidation reduction reaction at the electrode, providing the basis for the lithium secondary battery to exhibit high capacity and excellent cycle-life. Various types of materials are used as carbon-based negative electrode active materials, such as natural graphite and artificial graphite, which are crystalline carbon-based materials, or hard carbon and soft carbon, which are amorphous carbon-based materials. Among them, graphite-based active materials are the most widely used, as they are highly reversible and can improve the cycle-life characteristic of lithium secondary batteries. Since graphite active material has a lower discharge voltage of −0.2 V compared to lithium, a battery with graphite active material can exhibit a discharge voltage as high 3.6V. Therefore, it offers many advantages over lithium secondary batteries in terms of energy density. An artificial graphite, a crystalline carbon-based material, has a more stable crystal structure than natural graphite because it is made by applying high heat energy of more than 2,700° C. to create the crystal structure of graphite. Even with repeated charging and discharging of lithium ions, the crystal structure changes are small, resulting in a relatively long cycle-life. In general, an artificial graphite-based negative electrode active material has a cycle-life that is two to three times longer than natural graphite. Soft carbon and hard carbon, which are amorphous carbonaceous materials with unstabilized crystal structures, are characterized by smoother entry of lithium ions. Therefore, it can be used in electrodes that require fast charging because it can increase the charge and discharge speed. Considering the cycle-life characteristic and output characteristic of the lithium secondary battery to be used, it is common to use a mixture of the above carbon-based materials in a certain ratio to each other. Meanwhile, improving high temperature performance (storage characteristics at a high temperature and high temperature cycle characteristic) in a lithium secondary battery is an important challenge. If the total internal pore volume is high after the negative electrode active material is applied to the current collector and rolled, the high temperature performance of the negative electrode is likely to be deteriorated. Therefore, it is necessary to improve the high temperature characteristic of lithium secondary batteries by minimizing the changes in electrode structure and internal total pore volume that occur during electrode rolling. In particular, when developing negative electrode materials for fast-charging secondary batteries, improvement of high temperature characteristic is further required. With the technological development and increasing demand for mobile devices, the demand for secondary batteries as an energy source is increasing rapidly. Among such secondary batteries, lithium secondary batteries, which exhibit high energy density and operating potential, long cycle characteristic, and low self-discharge rate, are commercially available and widely used. In addition, as interest in environmental issues grows, there is a growing interest in electric vehicles and hybrid electric vehicles that can replace vehicles that use fossil fuels, such as gasoline and diesel vehicles, which are major problem of air pollution. Research on the use of lithium secondary batteries as a power source for such electric vehicles and hybrid electric vehicles is actively underway. A lithium secondary battery is a secondary battery that is generally composed of a positive electrode containing a positive electrode active material, a negative electrode containing a negative electrode active material, a separator and an electrolyte, and is charged and discharged by the intercalation-deintercalation of lithium ions. Lithium secondary batteries have the merits of high energy density, large electromotive force, and high-capacity, so they are applied in various fields. In particular, with the rapid rise of electric vehicles (EVs) in recent years, there is a growing need to improve the fast charging characteristic of lithium ion secondary batteries while preserving the existing capacity. This improvement in fast charging can only be attributed to the role of the active material of the negative electrode, which is responsible for the storage of lithium ions during charging. Since the active material of the negative electrode is mainly composed of carbon/graphite-based materials, it is important to form a stable SEI (Solid Electrolyte Interface) during charging. In terms of fast charging and life-cycle (stability), an artificial graphite has been the most seamlessly adopted, and we expect this trend to continue. In order to obtain artificial graphite, it is difficult to construct equipment to obtain secondary particles by mixing coke particles and binder materials and heat treating them, and in actual implementation, some contamination problems exist. There are drawbacks that make it difficult to guarantee uniformity so in terms of quality implementation by dispose. Therefore, it is necessary to proceed with the minimum number of processes.

SUMMARY OF THE INVENTION

One embodiment is to provide a negative electrode active material for a lithium secondary battery manufactured without including an assemble process, a manufacturing method thereof, and a secondary battery including the same.

One embodiment is to provide a negative electrode active material for a lithium secondary battery manufactured without going through an assemble process using coal tar, a manufacturing method thereof, and a secondary battery including the same.

The manufacturing method of the negative electrode active material for a lithium secondary battery according to one embodiment includes preparing an artificial graphite; mixing the artificial graphite and a coal tar to form a coating layer on the artificial graphite; and carbonizing the artificial graphite on which the coating layer is formed, wherein, the artificial graphite has a degree of sphericity of 0.6 to 1.

In the step of preparing an artificial graphite, the artificial graphite contains 20 wt % or more of artificial graphite derived from coal-based coke.

In the step of preparing an artificial graphite, the volume of artificial graphite having a particle size of 6 μm to 34 μm based on the entire volume of artificial graphite is 70 volume % or more.

In the step of preparing an artificial graphite, the sphericity of the artificial graphite having a particle size of 5 μm to 10 μm is 0.55 or more.

In the step of mixing the artificial graphite and coal tar to form a coating layer on the artificial graphite, the coal tar is included in 1 to 20 parts by weight based on 100 parts by weight of the artificial graphite.

In the step of mixing the artificial graphite and coal tar to form a coating layer on the artificial graphite, the coal tar has a quinoline insoluble content (QI) of 1 wt % to 7 wt % based on the entire weight of the coal tar.

In the step of mixing the artificial graphite and coal tar to form a coating layer on the artificial graphite, the coal tar has a fixed carbon amount of 10 to 30 wt % based on the entire weight of the coal tar.

In the step of mixing the artificial graphite and coal tar to form a coating layer on the artificial graphite, the coal tar has a light oil content of 30 wt % or less based on the entire weight of the coal tar.

In the step of mixing the artificial graphite and coal tar to form a coating layer on the artificial graphite, the coal tar has a toluene insoluble content (TI) of 50 wt % or less with respect to the entire weight of the coal tar.

In the step of mixing the artificial graphite and coal tar to form a coating layer on the artificial graphite, the beta resin content of the coal tar is 50 wt % or less with respect to the entire weight of the coal tar.

The step of preparing an artificial graphite may include pulverizing a coke; and graphitizing the coke;
  wherein, the coke is coal-based coke or a mixture of coal-based coke and petroleum-based coke, and the mixture of coal-based coke and petroleum-based coke contains 20 wt % or more of coal-based coke based on the entire weight.

The step of pulverizing a coke includes adjusting a sphericity of the pulverized coke.

The negative electrode active material for a lithium secondary battery according to one embodiment includes an artificial graphite and a carbon coating layer formed on the surface of the artificial graphite, derived from a coal tar, wherein, the artificial graphite has a degree of sphericity of 0.6 to 1.

The artificial graphite contains 20 wt % or more of artificial graphite derived from coal-based coke.

The carbon coating layer derived from coal tar, is included in 1 to 20 parts by weight based on 100 parts by weight of artificial graphite.

In the carbon coating layer derived from coal tar, the coal tar has a quinoline insoluble content (QI) of 1 wt % to 7 wt % based on the entire weight of the coal tar.

In the carbon coating layer derived from coal tar, the coal tar has a fixed carbon content of 10 to 30 wt % with respect to the entire weight of the coal tar.

In the carbon coating layer derived from coal tar, the coal tar has a light oil content of 30 wt % or less with respect to the entire weight of the coal tar.

In the carbon coating layer derived from coal tar, the coal tar has a toluene insoluble content (TI) of 50 wt % or less with respect to the entire weight of the coal tar.

In the carbon coating layer derived from coal tar, the coal tar has a beta resin content of less than 50 wt % with respect to the entire weight of the coal tar.

A lithium secondary battery according to one embodiment includes a negative electrode including a negative electrode active material manufactured from the negative electrode active material manufacturing method for a lithium secondary battery, positive electrode and an electrolyte.

A negative electrode active material for a lithium secondary battery according to one embodiment, its manufacturing method, and a secondary battery including this, do not undergo a separate assembly process by using coal tar, which is a liquid coating material.

A negative electrode active material for a lithium secondary battery according to one embodiment, a manufacturing method thereof, and a secondary battery including the same have excellent electrode adhesion.

A negative electrode active material for a lithium secondary battery according to an embodiment, a manufacturing method thereof, and a secondary battery including the same can provide an artificial graphite negative electrode active material composed of single particles without a separate assembly process.

DETAILED DESCRIPTION OF THE EMBODIMENTS

Terms such as first, second and third are used to describe, but are not limited to, the various parts, components, region, layers and/or sections. These terms are used only to distinguish one part, component, region, layer, or section from another part, component, area, layer, or section. Accordingly, a first part, component, region, layer or section described herein may be referred to as a second part, component, region, layer or section without departing from the scope of the present invention.

The technical terms used herein are intended to refer only to certain exemplary embodiments and are not intended to limit the present invention. The singular forms used here include plural forms unless the context clearly indicates the opposite. The meaning of "comprising" as used in a specification is to specify a particular characteristic, region, integer, step, behavior, element, and/or component, and does not exclude the existence or added any other characteristic, region, integer, step, behavior, element, and/or component.

When we say that a part is "on" or "above" another part, it may be directly on or above the other part, or it may entail another part in between. In contrast, when we say that something is "directly on" of something else, we don't interpose anything between them.

Also, unless otherwise noted, "%" refers to "wt %", where 1 ppm is 0.0001 wt %.

Unless otherwise defined, all terms used herein, including technical and scientific terms, have the same meaning as commonly understood by a person of ordinary skill in the technical field to which the present invention belongs. Commonly used dictionary-defined terms are further construed to have meanings consistent with the relevant technical literature and the present disclosure, and are not to be construed in an idealized or highly formal sense unless defined.

Hereinafter, an exemplary embodiment of the present invention will be described in detail so that a person of ordinary skill in the technical field to which the present invention belongs may readily practice it. As those skilled in the art would realize, the described embodiments may be modified in various different ways, all without departing from the spirit or scope of the present invention.

Hereinafter, each step will be looked at in detail.

The manufacturing method of the negative electrode active material for a lithium secondary battery according to one embodiment includes preparing an artificial graphite; mixing the artificial graphite and a coal tar to form a coating layer on the artificial graphite; and carbonizing the artificial graphite on which the coating layer is formed.

In the manufacturing method of the negative electrode active material for the secondary battery, the steps of preparing artificial graphite include pulverizing coke and graphitizing coke.

In addition, in the step of pulverizing coke during the preparation of artificial graphite, the coke is coal-based coke or a mixture of coal-based coke and petroleum-based coke.

The mixture of the coal-based coke and petroleum-based coke may contain 30 wt % or more of coal-based coke based on the entire weight of the mixture. Specifically, the coal-based coke may be 30 wt % to 100 wt %, or 40 wt % to 100 wt %, or 60 wt % to 100 wt %, or 70 wt % to 100 wt %.

Therefore, in the step of preparing the artificial graphite, the artificial graphite may contain 30 wt % or more of artificial graphite derived from a coal-based coke. Specifically, it may include 30 wt % to 100 wt %, or 40 wt % to 100 wt %, or 60 wt % to 100 wt %, or 70 wt % to 100 wt % of artificial graphite derived from coal-based coke.

In the step of pulverizing coke in the step of preparing the artificial graphite, the coal-based coke or petroleum-based coke may be green coke, calcined coke, or a mixture thereof, respectively. In addition, each coke may be needle-shaped coke, isotropic coke or a mixture thereof.

In the case of using coal-based green coke and coal-based calcined coke mixture as coal-based coke, the content of green coke may be 20 wt % or more with respect to the entire weight of the mixture. Specifically, it may be 20 to 100 wt %. The VM (Volatile Matter) content of coal-based green coke is generally 5 to 10 wt %. In the case of containing less than 20 wt % of coal-based green coke, there may be a problem in that the caking action is inferior due to poor wettability with coal tar, which is a coating material. Accordingly, when using coal-based green coke and coal-based calcined coke mixture for coal-based coke, coal-based green coke is preferably included in the range.

Also, artificial graphite according to the present invention is not an assembled product. That is, artificial graphite is a primary particle, a single particle itself, and is not assembled, and soft carbon adhesive or hard carbon adhesive is not included in artificial graphite used as a raw material in the negative electrode active material manufacturing method.

The pulverizing method used in the step of pulverizing the coke included in the step of preparing the artificial graphite is not limited as long as it can be adjusted to the particle size described below, but for example Jet mill, Pin mill, Air classifier mill, Raymond mill, jaw crusher, vertical roller mill, etc. can be used. The pulverized coke can be classified into a desired particle size using a vibrating sieve.

The step of pulverizing the coke may include adjusting the sphericity of the pulverized coke. The step of adjusting the degree of sphericity is not limited as long as a means capable of controlling the degree of sphericity is used, and a means for controlling the degree of sphericity by friction using centrifugal force can be used.

In the step of preparing the artificial graphite, the sphericity of the artificial graphite may be controlled by adjusting the sphericity of the pulverized coke. At this time, the provided artificial graphite may have a degree of sphericity of 0.6 to 1. Specifically, the degree of sphericity of artificial graphite may be 0.6 to 0.9, or 0.6 to 0.8. If the degree of sphericity is less than 0.6, it is impossible for the coal tar to coat the artificial graphite well, and there is a problem that a partially uncoated part occurs and a side reaction site increase. On the other hand, as the degree of sphericity approaches 1, that is, as the degree of sphericity approaches perfect spherical shape, a problem in that electrical conductivity decreases may occur.

In addition, the artificial graphite having a particle size of 5 μm to 10 μm may have a degree of sphericity of 0.55 or more. Specifically, the sphericity of artificial graphite having a particle size of 5 μm to 10 μm among artificial graphite may be 0.55 to 1 or 0.55 to 0.8. The generation of side reactions can be controlled only when the degree of sphericity of artificial graphite in the small particle section with a particle size of 5 μm to 10 μm is controlled in the range.

In the step of preparing the artificial graphite, the volume of the artificial graphite having a particle size of 6 μm to 34 μm based on the entire volume of the artificial graphite may be 70 volume % or more. The electrode adherence is good when the volume of artificial graphite with a particle size of 6 μm to 34 μm satisfies the range.

In the step of graphitizing coke in the step of preparing artificial graphite, the graphitization temperature is 2,200 to 3,300° C., and the graphitization treatment time is more than 3 hours.

In the step of mixing the artificial graphite and coal tar to form a coating layer on the artificial graphite, mixing of the artificial graphite and coal tar may be performed by mixing two or more rotating bodies in a vertical or horizontal direction. For example, it may be a step of mixing using a sigma blade type horizontal kneader. In addition, mixing of artificial graphite and coal tar may be performed for 5 minutes or more. By controlling the mixing time and mixing speed (rpm) according to the viscosity of the particularly used coal tar, the coal tar coating on the artificial graphite can be made uniform.

In the step of mixing the artificial graphite and coal tar to form a coating layer on the artificial graphite, the coal tar may be included in an amount of 1 to 20 parts by weight based on 100 parts by weight of the artificial graphite. Specifically, the coal tar may be included in 5 to 20 parts by weight, or 5 to 10 parts by weight based on 100 parts by weight of artificial graphite. If the coal tar content does not satisfy the range, there is a problem that the electrode adherence of the negative electrode active material is not sufficient for use in the product (e.g., 300 gf/cm² or less).

The coal tar may have a quinoline insoluble content (QI) of 1 wt % to 7 wt % based on the entire weight of the coal tar. Specifically, the coal tar may have a quinoline insoluble content (QI) of 2 wt % to 7 wt % or 2 wt % to 5 wt % based on the entire weight of the coal tar. If the content of quinoline insoluble content is high, there may be a problem that the electrode deteriorates after it is made of negative electrode material.

In addition, the coal tar may have a toluene insoluble content (TI) of 50 wt % or less based on the entire weight of the coal tar. Specifically, toluene insoluble content (TI) may be 10 to 50 wt % or 30 to 40 wt % based on the entire weight of coal tar.

In addition, the beta resin content of the coal tar may be 50 wt % or less with respect to the entire weight of the coal tar. Specifically, the beta resin content may be 10 to 50 wt % or 30 to 40 wt % with respect to the entire weight of coal tar. Beta resin content is a key factor that determines the negative electrode adhesion performance of negative electrode active material, and if the beta resin content is too large in coal tar, there may be a problem of poor adhesion.

In the present invention, the content of beta resin is determined the content of the remaining part, after:

toluene insoluble content is removed by ASTM D2318 (Standard Test Method for Toluene-Insoluble (TI) Content of Tar and Pitch), and quinoline insoluble content is removed by ASTM D2318 (Standard Test Method for Quinoline-Insoluble (QI) Content of Tar and Pitch).

In addition, the coal tar may have a fixed carbon content of 10 to 30 wt % at 25° C. based on the entire weight of the coal tar. Specifically, the coal tar may have a fixed carbon content of 20 to 30 wt %. If the amount of fixed carbon does not satisfy the content, there may be a problem of poor secondary battery performance, that is, discharge capacity and efficiency. In addition, if the amount of fixed carbon is too low, in order to realize the action as a coating material, the rotation rate of the mixer must be increased when mixing with artificial graphite, and as the rotation rate increases, the temperature inside the mixer and the mixture rises, resulting in performance may be deterioration. On the other hand, if the amount of fixed carbon is too large, it is difficult to liquidate, so that the desired advantages cannot be obtained through liquid coating, and there are drawbacks that must be processed in a higher process.

In addition, the coal tar may have a light oil content of 30 wt % or less based on the entire weight of the coal tar. Specifically, the coal tar may have a light oil content of 5 wt % to 30 wt %, or 10 wt % to 30 wt %, or 10 wt % to 20 wt % based on the entire weight of the coal tar. In the present invention, the light oil consists of crude light oil, absorbent oil, and naphthalene.

The viscosity of coal tar can be 5,000 to 30,000 mPa·s at 50° C. If the viscosity is lower than the range, there may be a problem in that the wettability is not good, and the artificial graphite base material and the coal tar are separately separated and the base material coating quality is deteriorated. On the other hand, if the viscosity is higher than the range, the viscosity is too high, so the impregnation property is improved, but the adhesion performance is lowered, causing phase separation with the artificial graphite base material, which may cause deterioration of the coating quality.

In addition, by controlling the viscosity of coal tar in the range in the negative electrode active material manufacturing method for lithium secondary batteries according to the present invention, artificial graphite composed of single particles, that is, only primary particles, can be directly coated. In addition, it can provide negative electrode active material having excellent adhesion to electrode without going through a separate assembly process, and energy and cost reduction effects can be obtained during the process.

In the step of mixing artificial graphite and coal tar to form a coating layer on artificial graphite, coal tar may be charged above artificial graphite to the mixing reactor. This is to ensure that the coal tar can be spread and applied to the artificial graphite as uniformly as possible. Specifically, coal tar may be added by spraying from the top to the bottom of the reactor into which the base material artificial graphite is loaded.

In the manufacturing method of the negative electrode active material for the secondary battery, in the step of carbonizing the artificial graphite on which the coating layer is formed, the carbonization temperature is less than 1,500° C. Specifically, the carbonization temperature is 800 to 1,500° C., or 1,000 to 1,200° C. Specifically, the temperature increase speed to the carbonization temperature is 5° C./min to 15° C./min, and it can be carbonized by maintaining the carbonization temperature for 1 to 5 hours. If the carbonization temperature is too low, the volatile matter removal rate is low, resulting in lower quality of the final product. If the carbonization temperature is too high, there is a problem that unnecessary energy consumption occurs at a temperature close to graphitization.

A negative electrode active material for a lithium secondary battery according to an embodiment includes an artificial graphite and a coal tar carbon coating layer formed on a surface of the artificial graphite, and the artificial graphite contains 30 wt % or more of artificial graphite derived from coal-based coke. The composition of the artificial graphite is as described above.

In addition, the artificial graphite may have a degree of sphericity of 0.6 to 1.

A lithium secondary battery according to one embodiment includes a negative electrode including a negative electrode active material manufactured by the manufacturing method described above; positive electrode; and electrolytes. Specifically, the lithium secondary battery may further include a separator disposed between the positive electrode and the negative electrode.

The negative electrode may be prepared by preparing a composition for forming a negative electrode active material layer by mixing the negative electrode active material prepared according to an embodiment, a binder, and optionally a conductive material, and then applying the composition to the negative electrode current collector.

Copper foil may be used for the negative electrode current collector.

The binder includes polyvinyl alcohol, carboxymethyl-cellulose/styrene-butadiene rubber, hydroxypropylene cellulose, diacetylene cellulose, polyvinyl chloride, polyvinylpyrrolidone, polytetrafluoroethylene, polyvinylidene fluoride, polyethylene or polypropylene can be used, but is not limited thereto. The binder may be mixed in an amount of 1 wt % to 30 wt % based on the total amount of the composition for forming the negative electrode active material layer.

The conductive material is not particularly limited as long as it has conductivity without causing chemical change in the battery. Specifically, graphite such as natural graphite and artificial graphite; carbon black such as acetylene black, ketchen black, channel black, furnace black, lamp black, and summer black; conductive fibers such as fibers and metal fibers; metal powder such as fluorinated carbon, aluminum, and nickel powder; conductive metal oxides such as zinc oxide, conductive whiskey titanium oxide (potassium titanate); a conductive material such as a polyphenylene derivative may be used. The conductive material may be mixed in an amount of 0.1 wt % to 30 wt % based on the total amount of the composition for forming the negative electrode active material layer.

Next, the positive electrode may be prepared by mixing a positive electrode active material, a binder, and optionally a conductive material to prepare a composition for forming a positive electrode active material layer, and then applying the composition to a positive electrode current collector. At this time, the binder and conductive material are used in the same way as in the case of the negative electrode described above.

The positive electrode current collector may use, for example, stainless steel, aluminum, nickel, titanium, sintered carbon, or surface treatment of aluminum or stainless steel with carbon, nickel, titanium, silver, or the like.

As the positive electrode active material, a compound capable of reversible intercalation and deintercalation of lithium (lithiated intercalation compound) can be used.

The positive electrode active material may specifically use one or more of cobalt, manganese, nickel or a composite oxide of its metal and lithium, and as a specific example, a compound expressed by one of the following Chemical Formulas may be used. $Li_aA_{1-b}R_bD_2$ (where $0.90 \leq a \leq 1.8$ and $0 \leq b \leq 0.5$); $Li_aE_{1-b}R_bO_{2-c}D_c$ (where $0.90 \leq a \leq 1.8$, $0 \leq b \leq 0.5$, and $0 \leq c \leq 0.05$); $LiE_{2-b}R_bO_{4-c}D_c$ (where $0 \leq b \leq 0.5$ and $0 \leq c \leq 0.05$); $Li_aNi_{1-b-c}Co_bR_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}Z_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}Z_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_b$-$Co_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); and $LiFePO_4$.

In the above formula, A is Ni, Co, Mn, or a combination thereof; R is Al, Ni, Co, Mn, Cr, Fe, Mg, Sr, V, a rare earth element, or a combination thereof; D is O, F, S, P, or combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

Non-aqueous electrolytes or known solid electrolytes can be used as electrolytes filled in the lithium secondary battery, and lithium salts dissolved in them can be used.

The lithium salt may use, for example, at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI. there is.

As the solvent of the non-aqueous electrolyte, for example, cyclic carbonates such as ethylene carbonate, propylene carbonate, butylene carbonate, and vinylene carbonate; chain carbonates, such as dimethyl carbonate, methyl ethyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; amides such as dimethylformamide may be used, but is not limited thereto. These may be used alone or in combination of a plurality of them. Particularly, a mixed solvent of cyclic carbonate and chain carbonate can be preferably used.

Also, as an electrolyte, a gel polymer electrolyte impregnated with an electrolyte solution in a polymer electrolyte such as polyethylene oxide or polyacrylonitrile, or an inorganic solid electrolyte such as LiI or $Li_3N$ is possible.

The separator is made of chemically resistant and hydrophobic olefin-based polymers such as polypropylene; a sheet or non-woven fabric made of glass fiber, polyethylene, etc. may be used. When a solid electrolyte solution such as a polymer is used as the electrolyte solution, the solid electrolyte solution may also serve as a separator.

DETAILED DESCRIPTION OF THE EMBODIMENTS

Hereinafter, an exemplary embodiment will be described in detail so that a person of an ordinary skill can easily practice it in the technical field to which the present invention belongs. However, the present invention may be embodied in many different forms, and is not limited to the exemplary embodiment described herein.

Experimental Example 1—Electrode Adherence Experiment According to Base Material Composition A negative electrode active material was prepared with artificial graphite having the composition shown in Table 1 below. The temperature of the graphitization step to obtain artificial graphite was 2,700° C., and the degree of sphericity of artificial graphite was 0.7 to 0.8.

Coal tar was mixed at 15 wt % compared to the artificial graphite base material, and mixing was performed for 45 minutes using a Sigma blade type horizontal kneader. The raw material was charged so that it was 60 to 80% of the entire area inside the kneader. The coal tar used at this time was primarily decanted from solids and moisture by centrifugation, and the quinoline insoluble (QI) content was 2% and the toluene insoluble (TI) content was 35%, and the beta resin content was 33%. In addition, coal tar with a fixed carbon content of 22% and a light oil content of 10% was used.

Then, the coated negative electrode active material was carbonized at 1,300° C. At this time, the heating speed up to the carbonization temperature was 10° C./min, and the carbonization was maintained at the carbonization temperature for 3 hours, and then cooled naturally to obtain a negative electrode active material prepared at 150° C.

97 wt % of the prepared negative electrode active material, 2 wt % of a binder including carboxymethyl cellulose and styrene butadiene rubber, and 1 wt % of Super P conductive material were mixed in a distilled water solvent to prepare a negative electrode active material slurry.

After the negative electrode active material slurry was applied to the copper (Cu) current collector, it was dried at 100° C. for 10 minutes and then compressed in a roll press. Afterwards, the time point at which desorption occurred was measured when drying in a vacuum oven at 100° C. for 12 hours. If desorption does not occur for 12 hours in the corresponding condition, it can be used as an electrode, so it was measured only for 12 hours. At this time, desorption means that the negative electrode active material is separated from the Cu plate, which is the negative electrode current collector.

The electrode density of the vacuum-dried negative electrode was 1.5 to 1.7 g/cc.

TABLE 1

| Category | Artificial graphite base material | Artificial graphite particle size distribution (μm) | | | Coal tar content (wt %) | electrode desorption time (hour) |
| --- | --- | --- | --- | --- | --- | --- |
| | | D10 | D50 | D90 | | |
| 1 | Coal-based coke:Petroleum-based coke = 3:7 | 9 | 18 | 38 | 15 | 8 |
| 2 | Coal-based coke:Petroleum-based coke = 4:6 | 7 | 19 | 37 | 15 | 12 |
| 3 | Coal-based coke:Petroleum-based coke = 6:4 | 7 | 15 | 36 | 15 | 12 |
| 4 | Coal-based coke:Petroleum-based coke = 7:3 | 8 | 16 | 37 | 15 | 12 |
| 5 | Coal-based coke:Petroleum-based coke = 10:0 | 7 | 18 | 35 | 15 | 12 |

Looking at the results in the Table 1, when petroleum-based coke is mixed at 70% or more, that is, when coal-based coke is mixed at 30% or less, as in the case of Category 1, the active material is desorbed in 8 hours in a vacuum oven. The adherence was found to be inferior. On the other hand, it was found that electrode adherence was excellent in the case of 100% coal-based coke without petroleum-based mixture. This is thought to be because coal tar is derived from coal and has better adherence with coal-based coke.

Experimental Example 2—Electrode Adherence Experiment According to Artificial Graphite Sphericity and Particle Size Distribution As shown in Table 2 below, artificial graphite derived from 100% coal-based coke with controlled sphericity and particle size distribution was used as a base material. In addition, the coal tar used was primarily solid and water removed (decanted) by centrifugation, and the quinoline insoluble (QI) content was 2% and the toluene insoluble (TI) content was 35%, and the beta resin content was 33%. In addition, coal tar with a fixed carbon content of 22% and a light oil content of 10% was used.

A negative electrode was prepared by the same method as in Example Embodiment 1, and the electrode desorption time was measured.

The adherence test of the present invention was tested by the ASTM D4541 test method by cutting the finally manufactured electrode into a 25 cm$^2$ size.

The adherence suitable for use as a negative electrode should be over 300 gf/cm$^2$. In the present invention, Flow-CAM PV equipment was used for the sphericity, and sample powder was dispersed in solvents such as ethanol, and then measured by optical image acquisition through a flow cell+ objective lens and shape analysis by a dedicated algorithm.

Category 6 had a degree of sphericity of 0.6 or less, and the resultant electrode detachment time was 10 hours, which was detached before 12 hours, and the electrode adherence was measured as 180 gf/cm$^2$, which is less than 300 gf/cm$^2$. This is because when the degree of sphericity is less than 0.6, it is difficult to properly coat the base material with coal tar.

Category 9 had a volume fraction of artificial graphite with a particle size of 6 μm to 34 μm less than 70%, and the resulting electrode detachment time was 9 hours, which was desorbed before 12 hours, and the electrode adherence was 270 gf/cm$^2$, which was less than 300 gf/cm$^2$.

Experimental Example 3—Electrode Adherence Experiment According to Coal Tar Content Except for using artificial graphite derived from 100% coal-based coke and having a sphericity of 0.78 as a base material and controlling the coal tar content as shown in Table 3 below, a negative electrode active material and a negative electrode are prepared in the same manner as in Example 1, and then the electrode desorption time was measured by the same method. The quinoline insoluble (QI) content, toluene insoluble (TI) content, beta resin content, fixed carbon content, and light oil content of the coal tar also used were the same as in the exemplary embodiment 1.

TABLE 2

| Category | Sphericity of artificial graphite | Artificial graphite particle size distribution | | | Volume fraction of artificial graphite with a particle size of 6 μm to 34 μm (volume %) | coal tar content | electrode desorption time (hour) | electrode adherence (gf/cm$^2$) |
| --- | --- | --- | --- | --- | --- | --- | --- | --- |
| | | D10 | D50 | D90 | | | | |
| 6 | 0.57 | 6 | 17 | 33 | 72 | 15 | 10 | 180 |
| 7 | 0.63 | 7 | 15 | 34 | 74 | 15 | 12 | 860 |
| 8 | 0.78 | 6 | 13 | 35 | 71 | 15 | 12 | 690 |
| 9 | 0.82 | 7 | 14 | 36 | 66 | 15 | 9 | 270 |

The adherence test of the present invention was tested by the ASTM D4541 test method by cutting the finally manufactured electrode into a 25 cm² size.

TABLE 3

| Category | Coal tar content (wt %) | Electrode desorption time (hours) | Electrode adherence (gf/cm²) |
|---|---|---|---|
| 10 | 5 | 12 | 900 |
| 11 | 10 | 12 | 980 |
| 12 | 20 | 12 | 850 |
| 13 | 25 | 8 | 160 |

Category 13 used 25 wt % of coal tar content, and exhibited deterioration characteristics with electrode detachment time of 8 hours and electrode adherence of 160 gf/cm².

Experimental Example 4—Battery Performance Evaluation According to Coal Tar Characteristics As a base material, artificial graphite was prepared using coal-based green coke:petroleum-based calcined coke=2:8, and a negative electrode active material and a negative electrode were prepared using 15 wt % of coal tar having the characteristics of Table 4 below.

Lithium metal is used as the positive electrode, which is the counter electrode, and a mixture where the volume ratio of ethylene carbonate (EC):dimethyl carbonate (DMC) 1:1 as the electrolyte solution obtained by dissolving a 1 mole of $LiPF_6$ was used.

Using the respective constituent elements, a half coin cell of 2032 coin cell type was fabricated according to a conventional manufacturing method.

TABLE 4

| | coal tar | | | | | | |
|---|---|---|---|---|---|---|---|
| Category | Quinoline insoluble content (wt %) | Toluene insoluble content (wt %) | Beta Resin (wt %) | Light oil content (wt %) | Fixed carbon content (wt %) | Discharge capacity (3$^{rd}$ cycle) (mAh/g) | Efficiency (1$^{st}$ cycle) (%) |
| 14 | 2 | 51 | 49 | 10 | 22 | 355 | 92 |
| 15 | 2 | 37 | 35 | 26 | 15 | 347 | 90 |
| 16 | 5 | 54 | 49 | 10 | 22 | 354 | 94 |
| 17 | 5 | 45 | 40 | 26 | 15 | 349 | 91 |
| 18 | 7 | 57 | 50 | 10 | 22 | 345 | 88 |
| 19 | 10 | 63 | 53 | 10 | 22 | 325 | 88 |

Commercial secondary battery characteristics currently required are discharge capacity of 350 mAh/g or more and efficiency of 92% or more.

In comparison, categories 15 and 17 did not satisfy the range of light oil content and fixed carbon content, and categories 18 and 19 had high quinoline insoluble content, and the measured discharge capacity and efficiency were not satisfied with 350 mAh/g or more and efficiency 92% or more.

The present invention is not limited to the exemplary embodiment, but can be manufactured in a variety of different forms, and a person of an ordinary skill in the technical field to which the present invention belongs is different without changing the technical idea or essential features of the present invention. It will be appreciated that it may be embodied in specific forms. Therefore, the exemplary embodiment described above should be understood as illustrative in all respects and not limiting.

What is claimed is:

1. A manufacturing method of a negative electrode active material for lithium secondary battery, comprising:

preparing an artificial graphite;

mixing the artificial graphite and a coal tar to form a coating layer on the artificial graphite; and carbonizing the artificial graphite on which the coating layer is formed, wherein, the artificial graphite has a degree of sphericity of 0.6 to 0.8.

2. The method of claim 1, wherein:

in the step of preparing an artificial graphite, the artificial graphite contains 20 wt % or more of artificial graphite derived from coal-based coke.

3. The method of claim 1, wherein:

in the step of preparing an artificial graphite, the volume of artificial graphite having a particle size of 6 μm to 34 μm based on the entire volume of artificial graphite is 70 volume % or more.

4. The method of claim 1, wherein:

in the step of preparing an artificial graphite, the sphericity of the artificial graphite having a particle size of 5 μm to 10 μm is 0.55 or more.

5. The method of claim 1, wherein:

in the step of mixing the artificial graphite and coal tar to form a coating layer on the artificial graphite, the coal tar is included in 1 to 20 parts by weight based on 100 parts by weight of the artificial graphite.

6. The method of claim 1, wherein:

in the step of mixing the artificial graphite and coal tar to form a coating layer on the artificial graphite, the coal tar has a quinoline insoluble content (QI) of 1 wt % to 7 wt % based on the entire weight of the coal tar.

7. The method of claim 1, wherein:

in the step of mixing the artificial graphite and coal tar to form a coating layer on the artificial graphite, the coal tar has a fixed carbon amount of 10 to 30 wt % based on the entire weight of the coal tar.

8. The method of claim 1, wherein:

in the step of mixing the artificial graphite and coal tar to form a coating layer on the artificial graphite, the coal tar has a light oil content of 30 wt % or less based on the entire weight of the coal tar.

9. The method of claim 1, wherein:

in the step of mixing the artificial graphite and coal tar to form a coating layer on the artificial graphite, the coal tar has a toluene insoluble content (TI) of 50 wt % or less with respect to the entire weight of the coal tar.

10. The method of claim 1, wherein:

in the step of mixing the artificial graphite and coal tar to form a coating layer on the artificial graphite, the beta resin content of the coal tar is 50 wt % or less with respect to the entire weight of the coal tar.

11. The method of claim 1, wherein:

the step of preparing an artificial graphite may include pulverizing a coke; and graphitizing the coke;

wherein, the coke is coal-based coke or a mixture of coal-based coke and petroleum-based coke, and the mixture of coal-based coke and petroleum-based coke contains 20 wt % or more of coal-based coke based on the entire weight.

12. The method of claim 11, wherein:

the step of pulverizing a coke includes adjusting a sphericity of the pulverized coke.

13. A negative electrode active material for a lithium secondary battery, comprising:

an artificial graphite and a carbon coating layer formed on the surface of the artificial graphite, derived from a coal tar, wherein, the artificial graphite has a degree of sphericity of 0.6 to 0.8.

14. The negative electrode active material of claim 13, wherein:

the artificial graphite contains 20 wt % or more of artificial graphite derived from coal-based coke.

15. The negative electrode active material of claim 13, wherein:

the carbon coating layer derived from coal tar, is included in 1 to 20 parts by weight based on 100 parts by weight of artificial graphite.

16. The negative electrode active material of claim 13, wherein:

in the carbon coating layer derived from coal tar, the coal tar has a quinoline insoluble content (QI) of 1 wt % to 7 wt % based on the entire weight of the coal tar.

17. The negative electrode active material of claim 13, wherein:

in the carbon coating layer derived from coal tar, the coal tar has a fixed carbon content of 10 to 30 wt % with respect to the entire weight of the coal tar.

18. The negative electrode active material of claim 13, wherein:

in the carbon coating layer derived from coal tar, the coal tar has a light oil content of 30 wt % or less with respect to the entire weight of the coal tar.

19. The negative electrode active material of claim 13, wherein:

in the carbon coating layer derived from coal tar, the coal tar has a toluene insoluble content (TI) of 50 wt % or less with respect to the entire weight of the coal tar.

20. The negative electrode active material of claim 13, wherein:

in the carbon coating layer derived from coal tar, the coal tar has a beta resin content of less than 50 wt % with respect to the entire weight of the coal tar.

* * * * *